(12) United States Patent
Drozdzak Matusiak et al.

(10) Patent No.: US 10,017,615 B2
(45) Date of Patent: Jul. 10, 2018

(54) CURABLE COMPOSITION AND MOLDED ARTICLE COMPRISING THE COMPOSITION

(71) Applicant: Telene SAS, Bondues (FR)

(72) Inventors: Renata Drozdzak Matusiak, Wasquehal (FR); Gilles Recher, Marcq-en-Baroeul (FR); Alexander Daemen, Overijse (BE); Jacob Cornelis Dijt, Eelde (NL)

(73) Assignee: Telene SAS, Bondues (FR)

( * ) Notice: Subject to any disclaimer, the term of this patent is extended or adjusted under 35 U.S.C. 154(b) by 0 days.

(21) Appl. No.: 15/501,794

(22) PCT Filed: Jul. 30, 2015

(86) PCT No.: PCT/EP2015/067511
§ 371 (c)(1),
(2) Date: Feb. 3, 2017

(87) PCT Pub. No.: WO2016/020261
PCT Pub. Date: Feb. 11, 2016

(65) Prior Publication Data
US 2017/0233538 A1 Aug. 17, 2017

(30) Foreign Application Priority Data
Aug. 7, 2014 (EP) .................................... 14306252

(51) Int. Cl.
| | | |
|---|---|---|
| C08G 61/08 | (2006.01) | |
| C08F 4/695 | (2006.01) | |
| C08K 7/02 | (2006.01) | |
| C08J 5/08 | (2006.01) | |
| C08J 5/24 | (2006.01) | |
| C08G 61/02 | (2006.01) | |

(52) U.S. Cl.
CPC ................ *C08J 5/08* (2013.01); *C08G 61/02* (2013.01); *C08G 61/08* (2013.01); *C08J 5/24* (2013.01); *C08F 4/695* (2013.01); *C08G 2261/11* (2013.01); *C08G 2261/3325* (2013.01); *C08G 2261/418* (2013.01); *C08J 2365/00* (2013.01); *C08J 2447/00* (2013.01); *C08J 2491/06* (2013.01); *C08K 7/02* (2013.01)

(58) Field of Classification Search
CPC ................................ C08G 61/08; C08F 4/695
See application file for complete search history.

(56) References Cited

U.S. PATENT DOCUMENTS 9,314,963 B2 * 4/2016 Sunaga ................. B29C 59/005

FOREIGN PATENT DOCUMENTS

| WO | WO9911454 A1 | 3/1999 |
|---|---|---|
| WO | WO0149628 A1 | 7/2001 |
| WO | WO2013158225 A1 | 10/2013 |

\* cited by examiner

*Primary Examiner* — Caixia Lu
(74) *Attorney, Agent, or Firm* — Bret E. Field; Bozicevic, Field & Francis LLP

(57) ABSTRACT

There is provided a curable composition comprising (A) a cyclic olefin; (B) a metathesis catalyst for polymerizing the cyclic olefin; (C) 0.1-30 wt. % of a compound comprising at least one vinyl group; and (D) 0.1-10 wt. % of a curing agent for compound (C), wherein the wt. % are relative to the total weight of the composition. The composition provides a desirable combination of workability, toughness and heat resistance. Also provided is a molded article comprising the composition and reinforcing fibers, and a method of manufacturing the same.

20 Claims, 2 Drawing Sheets

CURABLE COMPOSITION AND MOLDED ARTICLE COMPRISING THE COMPOSITION

TECHNICAL FIELD

The invention relates to a curable composition, a method of manufacturing a molded article of the curable composition, as well as a molded article comprising the composition. The invention in particular relates to a composition comprising a cyclic polyolefin. The composition provides a desirable combination of good workability, high toughness and high heat resistance.

BACKGROUND ART

Polymer matrix composites offer good mechanical and physical properties at relatively low weight. Composites may be based on either thermosetting or thermoplastic polymer matrix materials in which reinforcing fibers are embedded. The properties of composites are controlled by those of the fibers and the polymer matrix, whereby the interfacial region between the reinforcing fibres and the polymer matrix plays a special role. Indeed, a sufficient interface bonding between the reinforcing fibres and the polymer matrix to ensure adequate load transfer from the polymer matrix to the fibers is generally required for making effective use of the reinforcing fiber properties.

Composite properties, in particular toughness, are not easily predictable on the basis of constituent properties, and good properties of a polymer matrix material may not translate into good properties of the composite.

WO2013/158225 discloses styrenic modifiers for linear polyolefins, in particular polyethylene/polystyrene graft polymers and methods for producing such graft polymers. Disclosed methods may comprise contacting a styrenic block copolymer and an alkene in the presence of a metathesis catalyst. In some embodiments, a vinyl terminated polystyrene is grafted to a polyolefin by blending in the presence of a peroxide. The disclosed grafting process is also said to involve the use of metallocene catalysts. WO2013/158225 does not disclose the use of a metathesis catalyst for polymerizing a cyclic olefin.

WO 01/49628 discloses a method for the manufacture of fibre-reinforced composites using a cycloolefin resin. The disclosed cycloolefins may be catalysed by a ring opening metathesis polymerization reaction (ROMP). Preferred ROMP catalysts are said to include ruthenium and osmium carbine compounds. In addition, WO 01/49628 describes the use of a sizing composition that may comprise a vinyl compound, for example, vinylmethoxysilane. Such sizing composition for the reinforcing fibres is said to be compatible with the preferred ROMP catalysts. WO 01/49628 does not disclose a curing agent for the vinyl compound.

WO99/11454 also discloses fibre reinforced metathesis polymerised cycloolefin compounds. Suitable coupling agents for the reinforcing fibres include metacrylatochromic chloride complexes and silanes, such as vinyltriacetoxysilane, a vinyl compound. The compositions of WO99/11454 do not comprise a curing agent for such vinyl compound.

SUMMARY OF THE INVENTION

It is an aim of the present invention to provide a composition having a desirable combination of good workability, high toughness and high heat resistance. It is a further aim to provide a composition that when used as a polymer matrix material in a composite retains the desirable combination of properties. It is a further aim to provide a cyclic polyolefin composition having the above described advantages.

This and other aims are provided by a curable composition, comprising (A) a cyclic olefin; (B) a metathesis catalyst for polymerizing the cyclic olefin; (C) 0.1-30 wt. % of a compound comprising at least one vinyl group; and (D) 0.1-10 wt. % of a curing agent for compound (C), wherein the wt. % are relative to the total weight of the composition.

The prior art does not suggest a composition comprising a cyclic olefin and a metathesis catalyst for polymerising this cyclic olefin with a compound containing at least one vinyl group (compound (C)) and a curing agent (compound (D)) for polymerising compound (C) in the above relative quantities for achieving the above aims.

In an embodiment of the invention, compound (C) has a Hildebrandt solubility parameter comprised between 15.4 and 19.8 MPa$^{1/2}$. The Hildebrandt solubility parameters are calculated based on the three parameter system developed by Charles M. Hansen:

$$\delta_T{}^2 = \delta_D{}^2 + \delta_P{}^2 + \delta_H{}^2$$

wherein:
$\delta_T$=Total Hildebrand parameter
$\delta_D$=dispersion components
$\delta_P$=polar component
$\delta_H$=hydrogen bonding component Calculations are performed by using HSPiP software, which can be found at http://hansen-solubility.com.

In an embodiment of the invention, a composition is provided comprising 3-20 wt. % of the compound (C), more preferably 3-15 wt. % of the compound (C), and most preferably 4-12 wt. % of the compound (C).

Yet another embodiment relates to a composition wherein compound (C) comprises a (meth)acrylate compound.

Another embodiment of the invention provides a composition comprising 0.01-8 wt. % of the curing agent, more preferably 0.1-7 wt. % of the curing agent, even more preferably 0.2-1 wt. % of the curing agent, and most preferably 0.2-0.8 wt. % of the curing agent.

In yet another embodiment of the invention a composition is provided wherein the curing agent comprises a radical initiator.

Another embodiment of the invention relates to a composition wherein the radical initiator comprises a non-cyclic peroxide.

A further embodiment according to the invention provides a composition wherein the at least one cyclic olefin comprises a dicyclopentadiene.

Yet another embodiment of the invention provides a composition comprising reinforcing fibers provided with a sizing composition.

The sizing composition comprises at least a coupling agent and a film former. A useful embodiment of the invention provides a curable composition wherein a film former of the sizing composition has a Hildebrandt solubility parameter $\delta_T$ comprised between 15.9 and 19.9 MPa$^{1/2}$.

In another embodiment of the invention, the film former in the sizing composition comprises a (co)polymer of monomer units having from four to six carbon atoms and one carbon-carbon double bond, more preferably a polybutadiene.

Yet another embodiment of the invention provides a sizing composition wherein a film former comprises paraffin wax. It is also possible to provide the sizing compositions with more than one film former, a combination of polybutadiene and paraffin wax being a preferred embodiment.

Still another embodiment in accordance with the invention offers a composition wherein the coupling agent comprises a silane compound having unsaturations.

The invention also relates to a method of manufacturing a molded article of the invented composition, the method comprising:
 combining at least the components (A) to (D) to form the composition; and
 subjecting the composition to conditions effective to promote an olefin metathesis reaction of the cyclic olefin and a radical polymerization of compound (C).

A further embodiment of the method comprises the additional steps of:
 contacting the curable composition with an adhering substrate; and
 subjecting the curable composition to conditions to provide a bond between the composition and the adhering substrate.

Yet another embodiment relates to a method comprising the step of injecting the composition into a closed mold, preferably by providing the mold with reinforcing fibers prior to injecting the composition.

In another embodiment of the method, the conditions comprise heating at a temperature of between 120° C.-150° C. during at most 60 minutes. Such an embodiment of the method surprisingly yields a polymerized composition having a glass transition temperature above 180° C., notwithstanding the relatively low curing temperature range and duration.

The invention in another aspect relates to a molded article comprising a composition in accordance with the invention. In a particular embodiment a molded article of a composite material is provided, wherein the composite material comprises (a) a matrix polymer prepared by polymerizing the curable composition in accordance with any one embodiment thereof; and (b) reinforcing fibers in accordance with any one embodiment thereof, as disclosed in the present application.

The invention in an embodiment further relates to a molded composite article wherein the matrix polymer has a volatile content of less than 5 wt. %, more preferably less than 3 wt. % and most preferably less than 2 wt. % relative to the total weight of the matrix polymer. The relatively low volatile content of a polymerized composition in accordance with the invention offers environmental and other advantages. Volatiles may for instance be due to unreacted monomers or oligomers, originating from the curable composition components and/or sizing composition components. Volatile content is conveniently determined by subjecting a molded article to a temperature of 200° C. in a nitrogen environment and determining weight loss after a 1/2 hour period.

The invention further relates to a molded composite article obtainable by the method of the invention, wherein the composite material properties at least satisfy one of:
 a glass transition temperature Tg according to ASTM D7028-07e1 above 180° C.;
 a transverse 3 point bending strength according to ISO 14125 above 50 MPa; and
 a $G_{1c}$ according to ISO 15024 above 800 J/m$^2$.

In more preferred embodiments, the composite material properties at least satisfy two, and most preferably three of the listed properties.

DETAILED DESCRIPTION OF EMBODIMENTS OF THE INVENTION

Figure 1:
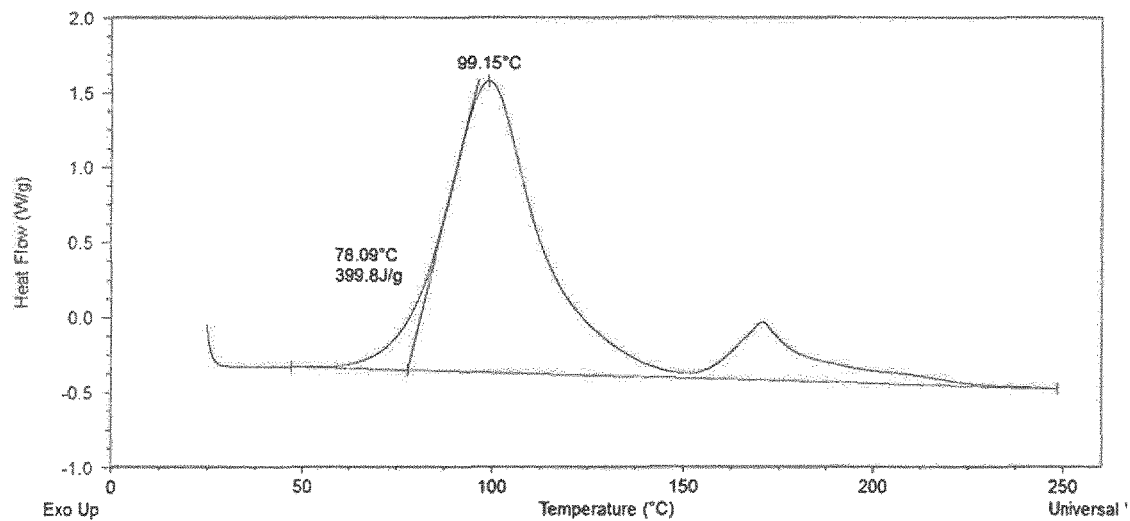
FIG. 1: DSC thermogram of the composition of Example 1.

The curable composition of the present invention comprises a cyclic olefin, a cyclic olefin metathesis polymerization catalyst, an compound (C) comprising a multifunctional unsaturated compound adapted to promote adhesion to an adhering substrate, and a curing agent for the compound (C).

The cyclic olefin used in the present invention comprises cyclic olefin monomer units that may be arranged to form a cyclic olefin polymer, obtained by polymerizing cyclic olefin monomer units. Any polymer of cyclic olefin monomer units known in the art may in principle be used in the invention. The cyclic olefin polymer comprises cyclic monomer units of a saturated cyclic hydrocarbon (cycloalkane) structure, and/or of an unsaturated cyclic hydrocarbon (cycloalkene) structure. The number of carbon atoms forming the cyclic structure in a monomer unit also is not particularly limited, but in preferred embodiments ranges from 4 to 30, more preferably from 5 to 20, and most preferably from 5 to 15.

The amount of cyclic olefin monomer units in the cyclic olefin polymer may be selected within a broad range, but is preferably 50 wt. % or more, more preferably 70 wt. % or more, and most preferably 90 wt. % or more, exclusive of any filler in the composition. A combination of different cyclic monomers may also be used. The cyclic olefin polymer of the composition may comprise an addition polymer of cyclic olefin monomer units, optionally copolymerized with another olefin monomer, and/or may comprise a ring-opening polymer of cyclic olefin monomer units, the latter being preferred.

A cyclic olefin monomer unit forms a cyclic structure of carbon atoms and carbon-carbon double bonds, examples whereof include but are not limited to norbornene based monomer units and monocyclic monomer units, a norbornene based monomer unit being preferred. The norbornene based monomer unit has a norbornene ring, and may for instance include 2-norbornene, norbornadiene and other bicyclic compounds; dicyclopentadiene (DCPD), dihydrodicyclopentadiene and other tricyclic compounds; tetracyclododecene, ethylidenetetracyclododecene, phenyltetracyclododecene and other tetracyclic compounds; tricyclopentadiene and other pentacyclic compounds; tetracyclopentadiene and other heptacyclic compounds; alkyl substituted compounds, such as methyl, ethyl, propyl and butyl substituted compounds, alkylidene substituted compounds, such as ethylidene substituted compounds, and aryl substituted compounds, such as phenyl and tolyl substituted compounds; and derivatives thereof having for instance an epoxy group, a methacryl group, a hydroxyl group, an amino group, a carboxyl group, a cyano group, a halogen atom, and others.

Monocyclic cyclic olefin monomer units may also be employed, suitable examples thereof comprising cyclobutene, cyclopentene, cyclooctene, cyclododecene, 1,5-cyclooctadiene and other monocyclic cyclic olefins, and substitution compounds and derivatives having polar groups like those mentioned as examples for the norbornene based monomer units. Such cyclic olefin monomers may be used alone or in combination with another or more types. Suitable linear olefin monomer units that may be addition-copolymerized with the above cyclic olefin monomer units include but are not limited to ethylene, propylene, I-butene, 1-pentene, 1-hexene, 1-octene, I-butene, 2-pentene, and 1,4-hexadiene for instance. The amount of the linear olefin monomer units used is preferably lower than 50 wt %, more preferably lower than 20 wt %, and more preferably lower than 10 wt % of the total amount of the cyclic olefin and linear olefin monomer units.

Apart from the cyclic olefin monomer units, the curable composition further comprises a cyclic olefin metathesis polymerization catalyst in an amount of 30-1000 ppm relative to the total weight of the composition. The metathesis polymerization catalyst of the invention comprises a catalyst capable of metathesis ring-opening polymerization of cyclic olefin monomer units. Such a catalyst may comprise a complex having a transition metal atom as center atom and a plurality of ions, atoms, and/or compounds bonded thereto. Transition metal atoms may be used to advantage, of which tantalum, molybdenum, tungsten, ruthenium and osmium may be mentioned in particular. Suitable catalyst systems are for instance disclosed in the following patent publications EP1468004, EP2280017, EP2151446, EP1757613, and EP1577282, incorporated herein.

Particularly useful catalytic systems comprise mono and bis-Schiff base catalysts, such as those depicted below:

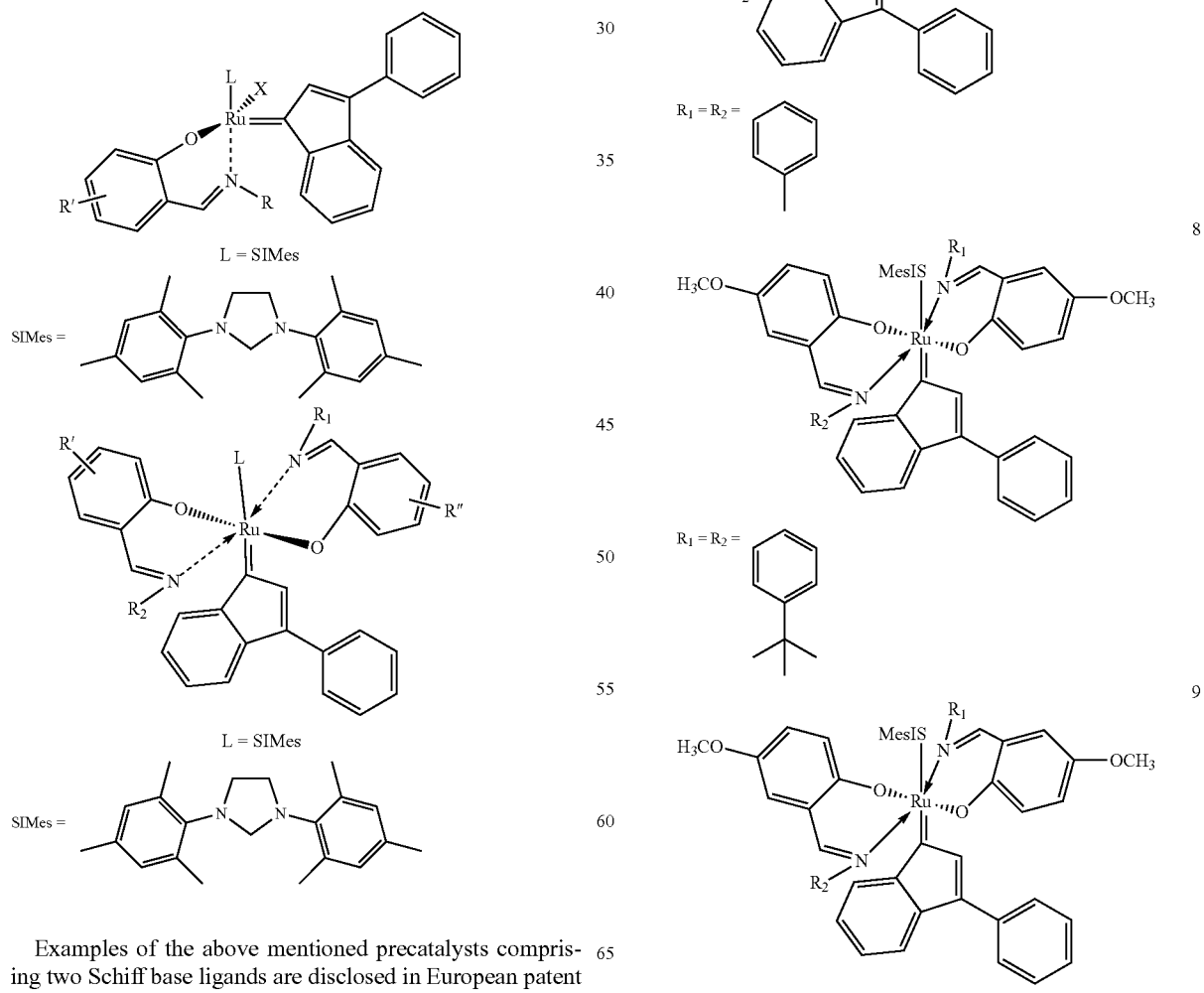

Examples of the above mentioned precatalysts comprising two Schiff base ligands are disclosed in European patent application EP2280017:

-continued
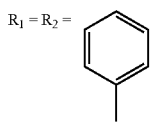
R₁ = R₂ =
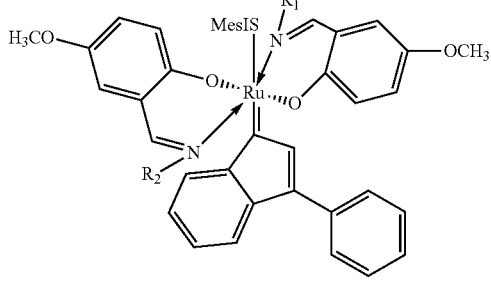
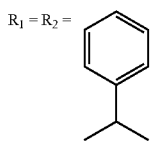
R₁ = R₂ =
SIMes =
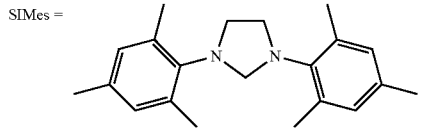
Other examples of catalysts which may be used in the present invention are disclosed below:
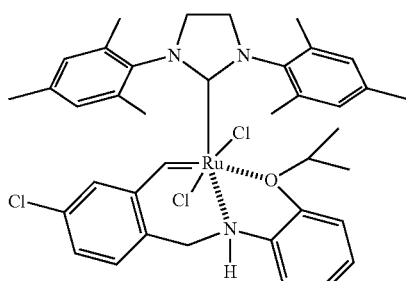
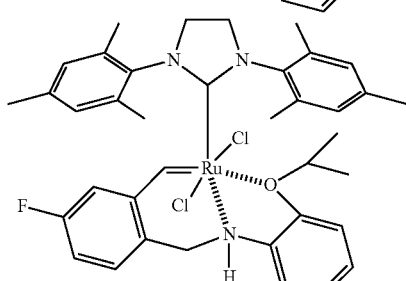
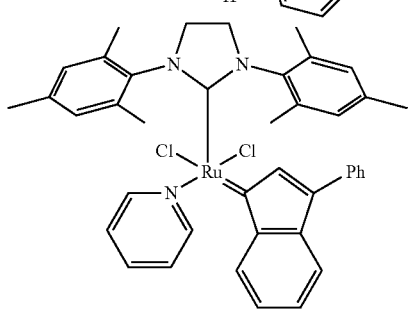
-continued
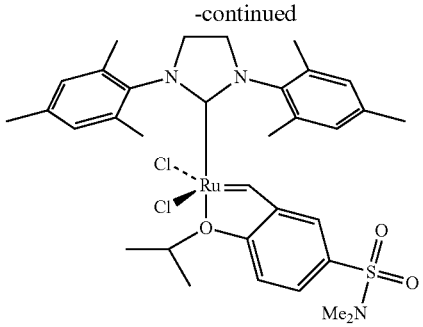
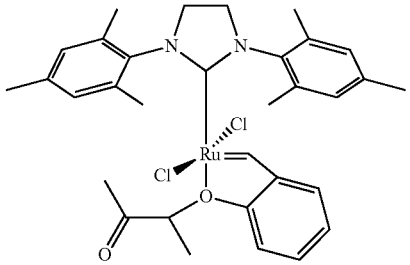
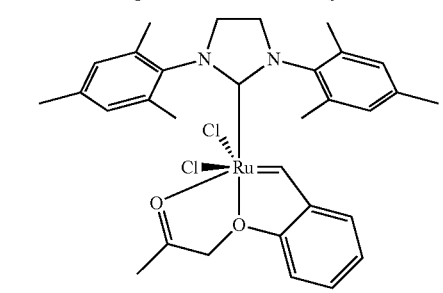
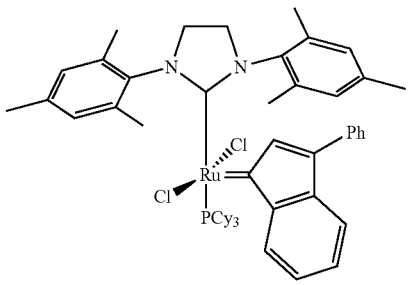
Particularly suitable catalysts also comprise Mo—W catalysts such as:
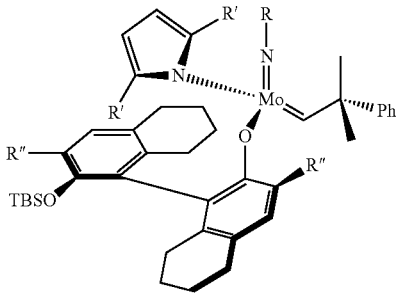

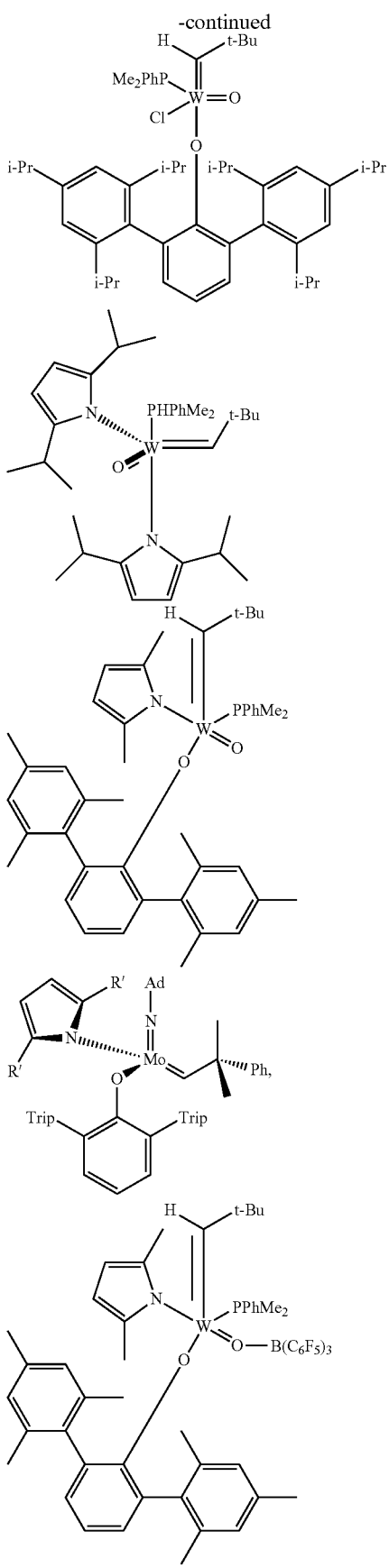

The olefin metathesis polymerization catalyst may be used in any suitable form, including a form in which it is dissolved or suspended in a solvent. Suitable solvents include linear aliphatic hydrocarbons such as n-pentane, n-hexane, n-heptane, or liquid paraffin, as well as alicyclic hydrocarbons such as cyclopentane, cyclohexane, alkyl substituted cyclohexane, di- and tricycloheptane, and cyclooctane to name a few, aromatic hydrocarbons such as benzene, toluene, xylene and others; nitrogen-containing solvents such as nitromethane, nitrobenzene, and acetonitrile, and oxygen-containing solvents such as diethyl ether and tetrahydrofuran.

The curable composition preferably also contains a catalyst retarder capable of extending working life time before curing starts. Suitable polymerization reaction retarders include but are not limited to phosphite compounds, such as those disclosed in EP2460587.

The composition may also comprise a chain transfer agent, for instance a linear olefin having substituted groups. Suitable chain transfer agents include vinylnorbornene, 1-hexene, 2-hexene and other aliphatic olefins; styrene, divinylbenzene, and other vinyl aromatic olefins; olefins having alicyclic hydrocarbon groups such as vinylcyclohexane; vinylethers; methylvinylketone, as well as substituted (meth)acrylic acids and their salts, such as vinyl(meth)acrylate, allyl(meth)acrylate, and compounds such as allyltrivinylsilane, allylmethyldivinylsilane, allyldimethylvinylsilane, and 4-vinylaniline Such chain transfer agents may be used alone or in combination and are generally added in an amount ranging from 0.01 to 10 pbw, and preferably 0.1 to 5 pbw with respect to 100 parts by weight of the cyclic olefin monomer units.

The composition in accordance with the invention further comprises 1-30 wt. % of a compound (C). Compound (C) comprises at least one vinyl group and may be monofunctional. A multifunctional compound comprising at least one vinyl group is also possible. Compound (C) is preferably configured to promote adhesion to an adhering substrate and capable of forming a polymeric structure. In preferred embodiments, the compound (C) does not substantially influence the catalytic activity of the metathesis polymerization catalyst in the composition, and is compatible with the cyclic olefin monomer units, i.e. does not give rise to phase separation. The compound (C) in a preferred embodiment has a Hildebrand solubility parameter comprised between 15.4 and 19.8 $MPa^{1/2}$, as calculated from Hansen parameters (http://hansen-solubility.com). The compound (C) in other preferred embodiments comprises a bi- or trifunctional compound, having two, respectively three carbon-carbon unsaturated bonds.

Preferred unsaturated compounds comprise ethylenically unsaturated compounds, which are here understood to mean vinyl aromatic compounds such as styrene, alpha-methylstyrene, para-methylstyrene, aminostyrene, hydroxystyrene, divinyl benzene, vinyl toluene; allyl compounds such as monoallyl esters and/or ethers and diallyl esters and/or ethers; vinyl ether and vinyl ester compounds such as vinyl benzoate; and (meth)acrylic compounds such as (meth)acrylic acids and their esters. Particularly preferred multifunctional unsaturated compounds comprise an acrylic and/or methacrylic compound. Suitable (meth)acrylic compounds include but are not limited to ethyleneglycol di(meth)acrylate, propanediol di(meth)acrylate, butanediol di(meth)acrylate, diethyleneglycol di(meth)acrylate, triethyleneglycol di(meth)acrylate, tetraethyleneglycol di(meth)acrylate, polyethyleneglycol di(meth)acrylate and other bifunctional compounds, as well as trimethylolpropane tri (meth)acrylate, trimethylolethane (tri)methacrylate, trimethylolpropanepropyleneoxide-modified tri (meth)acrylate and other trifunctional compounds. Combinations of unsaturated compounds may also be used.

Examples of suitable compounds (C) according to the present invention are depicted in Table 1.

TABLE 1

Solubility parameters for DCPD, butadiene acrylate and methacrylate monomers calculated based on Hansen Solubility Parameters. Calculations done by using: HSPiP software from http://hansen-solubility.com

| Entry | Name | Monomer $\delta_D$ | $\delta_P$ | $\delta_H$ | Total Hildebrand solubility parameter $\delta_T$ |
|---|---|---|---|---|---|
| 1 | Dicyclopentadiene | 17.6 | 1.7 | 2.9 | 17.92 |
| 2 | 1,6-Hexanediyl bisacrylate | 16.4 | 4.6 | 6.1 | 18.09 |
| 3 | butadiene | 14.9 | 3.3 | 3.6 | 15.68 |
| 4 | 2-(acryloyloxymethyl)-2-ethylpropane-1,3-diyl diacrylate | 16.7 | 3.9 | 6.2 | 18.24 |
| 5 | 1,2-Ethanediyl bis(2-methylacryla | 16.4 | 4.8 | 6.3 | 18.21 |
| 6 | Tetrahydro-2-furanylmethyl methacrylate | 16.8 | 5.2 | 5.7 | 18.49 |
| 7 | 1,6-Hexanediyl bis(2-methylacrylate) | 15.4 | 3.9 | 5 | 16.65 |
| 8 | 8-Methylnonyl methacrylate | 15.4 | 2.5 | 3.2 | 15.93 |
| 9 | 2-ethyl-2-(methacryloyloxymethyl)propane-1,3-diyl bis(2-methylacrylate) | 16.5 | 3 | 4.7 | 17.42 |
| 10 | 3,3,5-Trimethylcyclohexyl methacrylate | 16.2 | 2.5 | 2.6 | 16.60 |
| 11 | 11-Methyldodecyl methacrylate | 15.1 | 2 | 2.7 | 15.47 |
| 12 | Dodecane-1,12-diyl bis(2-methylacrylate) | 15 | 3 | 3.6 | 15.71 |
| 13 | Tricyclo[5.2.1.02,6]decane-3,3-diylbis(methylene) bis(2-methylacrylate) | 17.3 | 3.5 | 3.5 | 17.99 |
| 14 | Tricyclo[5.2.1.02,6]decanedimethanol diacrylate | 17.3 | 3.9 | 4.1 | 18.20 |
| 15 | 2,2-Propanediylbis(4,1-phenyleneoxy-2,1-ethanediyl) bisacrylate | 18.2 | 5.5 | 5.3 | 19.74 |

The composition in accordance with the invention further comprises 0.1-10 wt. % of a curing agent for compound (C). The curing agent for compound (C) in an embodiment is configured to produce radicals and initiate a radical polymerization reaction of compound (C) monomer or oligomer units to form a cross-linked compound (C) polymer.

Suitable curing agents include a radical source such as a peroxide, a hydroperoxide, a perester and/or a perketone compound, including cyclic and linear compounds. A linear (hydro) peroxide is particularly preferred as curing agent for the compound (C). Suitable peroxides include but are not limited to alkylperoxides, arylperoxides, and aralkyl or alkaryl peroxides. Secondary and tertiary aliphatic and aromatic hydroperoxides, such as tert-butyl hydroperoxide, tert-amyl hydroperoxide, and cumene hydroperoxide, are particularly preferred.

The peroxide compounds can generally be added to the reaction mixture at any point prior to the onset of a gel state, and are added to the composition in an amount of 0.01-8 wt. %, more preferably 0.1-7 wt. %, even more preferably 0.2-1 wt. %, and most preferably 0.2-0.8 wt. %. Alternatively, the peroxide compound can be added to compound (C) first and delivered to the composition during the metathesis catalyzation step.

Other additives may also be added to the composition such as flame retardants, light stabilizers, pigments, dyes and other colorants, as well as foaming agents for instance. Suitable flame retardants include but are not limited to phosphorus, nitrogen and halogen containing flame retardants, metal hydroxides such as aluminum hydroxide for instance, and antimony compounds such as antimony trioxide.

In preferred embodiments, fillers may be added to the composition of the present invention as substrate materials. Both inorganic and organic fillers may be used without any limitation, whereby an inorganic filler is preferred. Suitable inorganic fillers for instance include metal particles of iron, copper, nickel, gold, silver, aluminum, lead, and tungsten; carbon particles such as carbon black, graphite, activated carbon, carbon micro-balloons and the like; inorganic oxide particles such as silica, alumina, titanium oxide, iron oxide, zinc oxide, magnesium oxide, and the like; inorganic carbonate particles such as calcium carbonate and magnesium carbonate; calcium sulfate; inorganic silicate particles such as talc, clay, mica, kaolin, fly ash, montmorillonite, calcium silicate, and glass particles; as well as particles of titanate, aluminum nitride and silicon carbide. Suitable organic fillers may for instance comprise wood, starch, lignin, organic pigment, and polymer particles such as those of polystyrene, polyamide, polyolefins such as polyethylene and polypropylene, polyvinylchloride, elastomers and/or waste polymers. It is also possible to add functional fillers, such as piezoelectric ceramics, fillers that change static/conductive properties such as carbon nanotubes, and rheology modifiers. The fillers may be provided with a sizing composition in accordance with the invention.

According to certain embodiments of the invention the composition comprises reinforcing fibers as an adhering substrate. Suitable reinforcing fibers to be used in the present invention can be chosen within wide ranges. It is possible for instance to use inorganic fibers, such as glass fibers, carbon and graphite fibers, alumina fibers, tungsten fibers, molybdenum fibers, titanium fibers, steel fibers, boron fibers, silicon carbide fibers, and silica fibers. Other suitable fibers include organic fibers such as aramid fibers, ultra high molecular weight polyethylene fibers, liquid crystalline and other polyester fibers, and the like, as well as natural fibers and reinforcements. Preferred reinforcing fibers comprise glass and carbon fibers, of which E-glass, R-glass, S-glass and S2-glass fibers are used most preferably. Newer fibers like Advancetex/Hipertex and Innofiber from PPG may also be used.

The reinforcing fibers can be applied in any physical form, i.e. as mono- and multifilaments, or in the form of strands and yarns, as woven fabric or according to any other textile structure, as short fibers or as continuous fibers, or in the form of a preimpregnated sheet ('prepreg'). Any combination of different types of fibers is also possible. The amount of the reinforcing fibers may be chosen within wide ranges but suitable amounts generally range from 30-70 vol. %, a fiber volume fraction of 55-65 vol. % being preferred in most applications.

In other embodiments of the invention, the reinforcing fibres are provided with a coupling agent that is incorporated in a sizing composition. The sizing composition is configured to provide an improved adhesion of the composition to an adhering substrate material, such as reinforcing fibers. The adhering substrate material is preferably sized with commercially available silane compounds that do not interfere with the used olefin metathesis catalysts, and are compatible with cyclic olefin polymers, in particular polydicyclopentadiene.

In useful embodiments of the invention, a silane, thiol and/or titanate coupling agent is added to the sizing composition. Non-limiting examples of suitable silane coupling agents include methacrylate, acrylate, amino, or epoxy functionalized silanes, as well as alkyl, alkenyl, and norbornyl silanes. Particularly preferred silane coupling agents comprise allyltrimethoxy silane, styryltrimethoxy silane. N-vinylbenzyl-aminoethyl-γ-aminopropyltrimethoxy silane and salts thereof, as well as vinyltris(2-methoxyethoxy) silane, α-methacryloxybutyltrimethoxy silane, γ-mercaptopropyltrimethoxy silane, and aminoethyl-γ-aminopropyltrimethoxy silane.

The sizing formulation applied onto the adhering substrate, in particular the reinforcing fibers, typically further comprises a film former apart from the coupling agent and optionally a lubricant. The film former typically comprises a film forming polymer. Any components of a sizing formulation that do not substantially interfere with the metathesis catalyst operation and/or substantially decreases the cyclic olefin polymerization reaction are considered to be compatible with the composition and may generally be used in the invention.

Film formers that are compatible with and/or do not interfere with ring opening metathesis polymerization (ROMP) are preferably used and comprise epoxies, polyesters, polyurethanes, polyolefins, and/or polyvinyl acetates. Other common film formers that do not adversely affect the performance of the cyclic olefin metathesis catalyst may also be used. Film formers are typically used as nonionic, aqueous emulsions, and combinations of different film formers may be used if desired.

Particularly useful film formers of the sizing composition have a Hildebrandt solubility parameter $\delta_T$ comprised between 15.9 and 19.9 $MPa^{1/2}$.

In a particularly preferred embodiment of the invention, the sizing formulation, and the film former in particular. comprises a polyolefin. Suitable polyolefins include but are not limited to polyethylenes, polypropylenes, polybutylenes, and copolymers thereof, and the polyolefins may be oxidized, maleated, or otherwise treated for effective film former use. In a preferred embodiment of the invention, the film former comprises a (co)polymer of monomer units having from four to six carbon atoms and one carbon-carbon double bond, and more preferably a polybutadiene, which may be functionalized or comprise a butadiene-styrene co-polymer for instance. The polybutadiene-based film former preferably comprises a polymer emulsion, wherein the polybutadiene has a weight average molecular weight between 300 and 20000 and has a solubility parameter $\delta T$ calculated from 3 Hansen parameters of at least 15.9 MPa1/2 and not more than 19.9 MPa1/2. Examples of suitable polybutadiene-based film formers are available from Cray Valley and Synthomer under the tradenames of RICON, Krasol and Lithene.

A nonionic lubricant as well as an anti-static agent may also be added to the sizing composition. Suitable nonionic lubricants that are compatible with ROMP compositions include but are not limited to esters of polyethylene glycols and block copolymers of ethylene oxide and propylene oxide. More than one nonionic lubricant may be used in a given sizing formulation if desired. Suitable nonionic lubricants include but are not limited to block copolymers of ethylene oxide and propylene oxide. Cationic lubricants may also be added to the sizing composition, such as polyethyleneimines for instance. The sizing composition may further comprise pH modifiers, such as acetic acid. The sizing composition may further comprise other useful additives, such as emulsifiers, defoaming agents and cosolvents, as well as biocides and antioxidants for instance. The sizing composition can be prepared by any method known in the art and applied to the adhering substrate and to the reinforcing fibers in particularly useful embodiments by any method, known in the art.

The invention is also directed to molded articles manufactured from the invented composition comprising a cyclic olefin, a cyclic olefin metathesis catalyst, such as a ROMP catalyst, a compound (C), a curing agent for the compound (C), and optionally an adhering substrate, such as, for example reinforcing glass fibers. Molded articles according to the invention are obtained by a method comprising combining at least the components (A) to (D) to form the composition; subjecting the composition to conditions effective to promote an olefin metathesis reaction of the cyclic olefin and a radical polymerization of compound (C), preferably comprising the additional step of contacting the composition with an adhering substrate; and subjecting the composition to the conditions to provide a bond between the composition and the adhering substrate.

Methods of manufacturing the molded articles may include but are not limited to those formed by state of the art composite manufacturing techniques, such as casting, centrifugal casting, pultrusion molding, injection pultrusion molding, filament winding, rotational molding, and open mold molding. In an embodiment of the invention, a method is provided comprising the step of injecting the composition into a closed mold, wherein the mold is preferably provided with reinforcing fibers prior to the injection of the composition. Such techniques include reaction injection molding (RIM), resin transfer molding (RTM), vacuum assisted resin infusion (VARI), Seeman's Composite Resin Infusion Molding Process (SCRIMP), Reinforced Reaction Injection Molding (RRIM), Structural Reaction Injection Molding (SRIM), thermal expansion transfer molding (TERM), resin injection recirculation molding (RICM), controlled atmospheric pressure resin infusion (CAPRI), and the like.

Subjecting the composition to conditions effective to promote an olefin metathesis reaction of the cyclic olefin and a radical polymerization of the compound (C), generally involves heating the composition to a suitable curing temperature during a suitable time interval, optionally at a pressure above 0.1 MPa. The heating temperature in an embodiment of the method is in a range of RT to 200° C., more preferably 50° C. to 200° C., even more preferably 120° C. to 150° C. The heating times preferably are in a range of 0.1 to 180 minutes, more preferably 1 to 120 minutes, even more preferably 10 to 60 minutes. The pressure applied during molding may be selected in accordance with the manufacturing method used and may be as low as a 0.1 to 0.5 MPa, for instance when using RTM. Vacuum or reduced pressures may also be used.

A particularly preferred embodiment relates to a method wherein the conditions comprise heating at a temperature between 120° C.-150° C. during at most 60 minutes.

Molded article may be used in a variety of applications, including but not limited to aerospace components, marine components, automotive components, sporting goods, electrical components, medical components, and military components. In useful embodiments the molded article may be a turbine component such as a turbine blade component or turbine blade. Examples of aerospace components may include but are not limited to fuselage skins, wings, fairings, doors, access panels, and stiffeners for instance. Examples of automotive components may include but are not limited to body panels, fenders, spoilers, protective plates, hoods, pillars, leaf springs and doors. Other examples of suitable articles include bridges, pipes, pressure vessels, containers, and so on. Examples of military components include but are not limited to ballistic resistant armor plates and other structures for protecting personnel or equipment. Suitable sporting goods may include tennis rackets, hockey sticks, golf club shafts and the like.

A molded article in accordance with the invention and made form a PDCPD composition in particular shows an unprecedented combination of properties, in particular a relatively high toughness, even at very low temperatures, a relatively high chemical corrosion resistance, and a relatively high heat deflection temperature or glass transition temperature Tg, the properties being relative to the state of the art PDCPD molded articles. Also, the (matrix) polymer has a volatile content of less than 3 wt. % relative to the total weight of the matrix polymer in certain preferred embodiments.

A useful embodiment of the invention provides a molded article wherein the composite material properties at least satisfy one of a glass transition temperature Tg according to ASTM D7028-07e1 above 180° C.; a transverse 3 point bending strength according to ISO 14125 above 50 MPa; and a $G_{1c}$ according to ISO 15024 above 800 J/m².

EXAMPLES

The present invention will now be described more specifically with reference to examples and comparative examples, without however being limited to these examples. It is to be noted that, in the examples and comparative examples, "parts" and "%" are based on weight basis unless otherwise noted.

Each property in the examples and comparative examples was measured and evaluated in accordance with the following methods:
Three point bending: ISO 14125
Glass transition temperature Tg: ASTM D7028-07e1
Tensile tests: ASTM 3039
Wettability: by visual inspections
Quality assessment: X-ray tomography (nanotom)
Compressive strength: ASTM 3410
Solubility parameters were calculated by using: "*HSPiP—Hansen Solubility Parameters in Practice (HSPiP)*" software (http://hansen-solubility.com) based on Charles Hansen's *Hansen Solubility Parameters, A User's Handbook, 2nd Edition* from 2007
Tensile fatigue tests: ASTM 3479
Interlaminar fracture toughness ($G_{1c}$): ISO 15024
Compression after impact: ISO 18352
Quality Assessment
Hand-pultruded samples (F1 PDCPD-T48 glass) were analysed with X-ray tomography (nanotom) to assess the quality of the production process (voids, fibre orientation etc.).
Transverse Three Point Bending Tests Transverse 3 point bending tests were done to provide an indication of the adhesion strength between fibres and matrix, for four combinations of fibre sizing/matrix. The test samples were cut from wide unidirectional rods by means of a water-cooled diamond saw, and the edges were sanded to eliminate damage resulting from the cutting. Eight samples were tested for each material combination.
Test Details
    Tests carried out on an instron 5567 machine with 1 kN loadcell
    ISO standard 14125 was followed
    Nominal sample dimensions: 70*10*2 mm, fibre direction perpendicular to sample axis
    Span length: 40 mm
    Test speed: 1 mm/min
Compression Tests
Test Details
    Sample cross-section approximately 8*4 mm², aluminium 1.5 mm endtabs, sample gage length 15 mm
    Tests carried out on an instron 5985
    According to ASTM 3410 standard
    Test speed: 1.5 mm/min
    Strain measurement: digital image correlation, Limess snapshot system
Instrumented Drop Weight Impact Tests and Ultrasonic Scan
Test Details
    tests carried out on the 'Huntsman' impacter, 16 mm tub
    impact energy (potential) 15.00 and 25.00 Joules
    drop height: 49 cm-81.5 cm
    impacter weight: 3.120 kg
    sample dimensions: 10×10 cm
Tensile Tests
Test Details
    Tests carried out on an Instron 4505, load cell 100 kN
    According to ASTM 3039 standard
    Test speed: 2 mm/min
    Strain measurement: digital image correlation, Limess 3D system
Tensile Fatigue Tests
Test Details
    Tests carried out on a 160 kN hydraulic Schenck.
    According to ASTM 3479 standard, rectangular samples, end tabbed
    Test frequency: 5 Hz
    R-ratio: 0.1 (ratio of minimum fatigue stress over maximum fatigue stress)
Interlaminar Fracture Toughness ($G_{1c}$)
    Test details: Unidirectional composite laminates, made by infusion of rovings wound around a mold plate, with a central crack starting film (aluminum foil). Samples have been made thicker by gluing aluminum bars on the top and bottom.
    Specimen dimensions: 20*200 mm²
    Testing standard: ISO 15024

Compression after Impact (CAI)
Test details: Composite laminates consisting of 4 layers of plain weave glass fibre fabric infused with F2.06 or epoxy.
Specimen dimensions: 150*100*4.3 mm$^2$
Testing standard: ISO 18352

Solubility Parameters

Calculated based on the three parameter system developed by Charles M. Hansen. Calculations done by using HSPiP software (http://hansen-solubility.com).

TABLE 2

Solubility parameters for selected polymers calculated based on Hansen Solubility Parameters. Calculations done by using: HSPiP software from http://hansen-solubility.com

| | | Polymer | | | Total Hildebrand solubility parameter |
|---|---|---|---|---|---|
| Entry | Name | $\delta_D$ | $\delta_P$ | $\delta_H$ | $\delta_T$ |
| 1 | Polydicyclopentadiene | 17.9 | 1 | 1 | 17.96 |
| 3 | Polybutadiene | 15.9 | 0.2 | 1.1 | 15.94 |
| 4 | Poly(2-(acryloyloxymethyl)-2-ethylpropane-1,3-diyl diacrylate) | 16.8 | 3.7 | 5.5 | 18.06 |
| 9 | Poly(2-ethyl-2-(methacryloyloxymethyl)propane-1,3-diyl bis(2-methylacrylate) | 16.8 | 1.4 | 3.1 | 17.14 |
| 13 | Poly(tricyclo[5.2.1.02,6]decane-3,3-diylbis(methylene) bis(2-methylacrylate) | 17.5 | 2.2 | 3 | 17.89 |
| 14 | Poly(tricyclo[5.2.1.02,6]decanedimethanol diacrylate) | 17.5 | 2.9 | 3.9 | 18.16 |

Example 1

A DCPD formulation was prepared by mixing 89.9 g of DCPD monomer units, 10 g of 2,2-Bis[(methacryloyloxy)methyl]butyl methacrylate (TMPTMA, Sigma-Aldrich) (10%) and 0.1 wt. % of a tert-butyl peroxide (TBP, Sigma-Aldrich). Then 1.2 g of the ruthenium salicylaldimine catalyst solution comprising 0.02 g of triisopropyl phosphite was added. The resulted solution was stirred 5 min at RT.

The curing behaviour of the ensuing curable composition was determined by obtaining a DSC thermogram of the composition. The DSC was taken with a Universal V4.5A of TA Instruments and the heating rate was 10° C./minute.

FIG. 1 represents the thermograph of the polymerization reaction of the composition of Example 1. The total enthalpy of the polymerization reaction is in the range of 399 J/g which is close to the enthalpy of a ring opening metathesis polymerization (ROMP) of DCPD (380 J/g). A first peak at around 99° C. corresponds to the ROMP while the second peak around a temperature of 165° C. corresponds to the radical polymerization of TMPTMA.

Example 2

A composition was obtained in the same manner as in Example 1, except that 1 wt. % of a tert-butyl peroxide (Sigma-Aldrich) and 30% of TMPTMA was added.

The curing behaviour of the ensuing curable composition was again determined by obtaining a DSC thermogram of the composition. The DSC was taken with a Universal V4.5A of TA Instruments and the heating rate was 10° C./minute.

Figure 2:
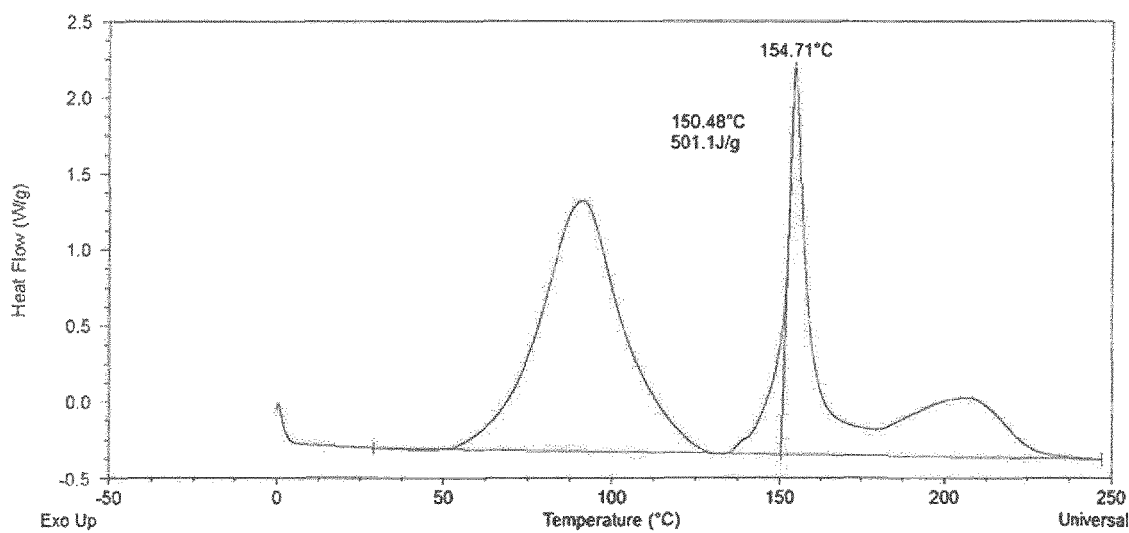
FIG. 2: DSC thermogram of the composition of Example 2.

FIG. 2 represents the thermograph of the polymerization reaction of the composition of Example 2. The first peak corresponds to the ROMP while the second peak around a temperature of 155° C. corresponds to the radical polymerization of TMPTMA. A somewhat larger exothermic peak at around 190° C. is apparent, in accordance with the larger amount of tert-butyl peroxide in the composition. The total enthalpy was 500 J/g by far higher than ROMP of DCPD only Example 3

A composition was obtained in the same manner as in Example 1, except that 0.6 wt. % of a tert-butyl peroxide (TBP, Sigma-Aldrich) was added.

A composite plate was prepared by a vacuum infusion method in which about 59 vol. % of a woven fabric of T48 glass fibers was impregnated with the composition at room temperature. T48 glass fibers are obtainable from PPG and carry an optimized sizing (T48) comprising polybutadiene or a polybutadiene derivative (ex. Lithene Ultra) as a film former which turned out to be highly soluble and compatible with DCPD and to allow achieving a good fibre wetting at room temperature. Furthermore a commercially available silane: N-Vinylbenzyl-N'-aminoethyl-3-aminopropylpolysiloxane, hydrochloride was used in the sizing formulation, which is a styrene derivative possessing a double bond available for the cross metathesis reaction. This enables to create a covalent bond between PDCPD matrix and the glass surface in the presence of the metathesis polymerization catalyst.

After resin infusion, the plate was formed by curing the composition at a temperature of around 90° C. during 20 minutes. A postcure was conducted at 190° C. during 60 minutes.

Example 4

A composition was obtained in the same manner as in Example 1, except that 1.5 wt. % of a tert-butyl peroxide was added.

A composite plate was prepared in the same manner as in Example 3, except that the composite plate comprised about 62 vol. % of the woven fabric. Cure and postcure were the same as in Example 3.

Example 5

A composition was obtained in the same manner as in Example 1, except that 3.0 wt. % of a tert-butyl peroxide was added.

A composite plate was prepared in the same manner as in Example 3, except that the composite plate comprised about 61 vol. % of the woven fabric. Cure and postcure were the same as in Example 3.

Example 6

A composition was obtained in the same manner as in Example 1, except that 0.6 wt. % of a tert-butyl peroxide was added.

A composite plate was prepared in the same manner as in Example 3, and the composite plate comprised about 59 vol. % of the woven fabric. The applied cure cycle was the same as in Example 3. Postcure however was conducted at 120° C. during 60 minutes.

Example 7

A composition was obtained in the same manner as in Example 1, except that 1.5 wt. % of a tert-butyl peroxide (Sigma-Aldrich) was added.

A composite plate was prepared in the same manner as in Example 3, and the composite plate comprised about 59 vol. % of the woven fabric. The applied cure cycle was the same as in Example 3. Postcure however was conducted at 120° C. during 60 minutes.

Example 8

A composition was obtained in the same manner as in Example 1, except that 5 wt. % of a trimethyl propane trimethacrylate (TMPTMA, Sigma-Aldrich) and 0.3 wt. % of a tert-butyl peroxide (Sigma-Aldrich) were added to the composition.

A composite plate was prepared in the same manner as in Example 3, and the composite plate comprised about 60 vol. % of the woven fabric. The applied cure cycle was the same as in Example 3. Postcure was also conducted at 190° C. during 60 minutes.

Example 9

A composition was obtained in the same manner as in Example 1, except that 5 wt. % of a trimethyl propane trimethacrylate (TMPTMA, Sigma-Aldrich) and 0.6 wt. % of a tert-butyl peroxide (Sigma-Aldrich) were added to the composition.

A composite plate was prepared in the same manner as in Example 3, and the composite plate comprised about 61 vol. % of the woven fabric. The applied cure cycle was the same as in Example 3. Postcure was also conducted at 190° C. during 60 minutes.

Example 10

A composition was obtained in the same manner as in Example 1, except that 10 wt. % of a Poly(2-(acryloyloxymethyl)-2-ethylpropane-1,3-diyl diacrylate) (TMPTA, Sartomer SR 351) and 0.6 wt. % of a tert-butyl peroxide (Sigma-Aldrich) were added to the composition.

A composite plate was prepared in the same manner as in Example 3, and the composite plate comprised about 60 vol. % of the woven fabric. The applied cure cycle was the same as in Example 3. Postcure was also conducted at 190° C. during 60 minutes.

Example 11

A composition was obtained in the same manner as in Example 1, except that 10 wt. % of a Tricyclo[5.2.1.0²,⁶] decane-3,3-diylbis(methylene) bis(2-methylacrylate) (TCD-DMDMA, Sartomer SR 834) and 0.6 wt. % of a tert-butyl peroxide (Sigma-Aldrich) were added to the composition.

A composite plate was prepared in the same manner as in Example 3, and the composite plate comprised about 60 vol. % of the woven fabric. The applied cure cycle was the same as in Example 3. Postcure was also conducted at 190° C. during 60 minutes.

Example 12

A composition was obtained in the same manner as in Example 1, except that 10 wt. % of a Tricyclo[5.2.1.0²,⁶] decanedimethanol diacrylate (TCDDMDA, Sartomer SR 833S) and 0.6 wt. % of a tert-butyl peroxide (Sigma-Aldrich) were added to the composition.

A composite plate was prepared in the same manner as in Example 3, and the composite plate comprised about 60 vol. % of the woven fabric. The applied cure cycle was the same as in Example 3. Postcure was also conducted at 190° C. during 60 minutes Comparative Experiment A A composition was obtained in the same manner as in Example 1, except that trimethyl propane trimethacrylate (TMPTMA) and the tert-butyl peroxide were not added to the composition.

A composite plate was prepared in the same manner as in Example 3, and the composite plate comprised about 60 vol. % of the woven fabric. The applied cure cycle was the same as in Example 3. Postcure was also conducted at 190° C. during 60 minutes.

Comparative Experiment B

A composition was obtained in the same manner as in Example 3, except that the glass fibers were obtained from PPG carrying a standard sizing (1383)

A composite plate was prepared in the same manner as in Example 3, and the composite plate comprised about 60 vol. % of the woven fabric. The applied cure cycle was the same as in Example 3. Postcure was also conducted at 190° C. during 60 minutes.

Comparative Experiment C

An Epikote 828 epoxy resin and diaminocyclohexane hardener composition was used as a matrix material in a composite plate.

The composite plate was prepared in the same manner as in Example 3, and the composite plate comprised about 60 vol. % of the woven fabric, the glass fibers of which were coated with a 1383 sizing, obtainable from PPG. The applied cure and postcure cycle were those advised for Epikote 828.

Results

Table 3 represents the composition of the composite samples and results related to thermal resistance.

TABLE 3

Composition and thermal resistance of composite samples

| Example | Unsaturated additive type | Unsaturated additive wt. % | TBP wt. % | Postcure temperature ° C. | Wettability | Fiber volume content vol. % | Tg° C. |
|---|---|---|---|---|---|---|---|
| 3 | TMPTMA | 10 | 0.6 | 190 | Good | 59 | 216 |
| 4 | TMPTMA | 10 | 1.5 | 190 | Good | 62 | 250 |
| 5 | TMPTMA | 10 | 3 | 190 | Good | 61 | 260 |
| 6 | TMPTMA | 10 | 0.6 | 120 | Good | 59 | 212 |
| 7 | TMPTMA | 10 | 1.5 | 120 | Good | 59 | 215 |
| 8 | TMPTMA | 5 | 0.3 | 120 | Poor | 60 | 206 |
| 10 | TMPTA | 10 | 0.6 | 190 | Good | 60 | 210 |
| 11 | TCDDMDMA | 10 | 0.6 | 190 | Good | 60 | 201 |
| 12 | TCDDMDA | 10 | 0.6 | 190 | good | 60 | 203 |
| A | | 0 | 0 | 190 | Poor | 60 | 178 |

As can be seen in table 1, all samples according to the invention show a glass transition temperature Tg above that of the reference sample (Comparative Experiment A). Peroxide content appears to determine the Tg values and the highest Tg of 260° C. was measured for the sample containing 3% of TBP. At the same time all samples in accordance with the invention, and particularly those containing 0.6-3% of peroxide, showed a good wettability, substantially independent from the TMPTMA loading and the post cure temperature.

Composite samples according to Example 3 were compared with those of Comparative Experiments A, B and C (Table 4).

TABLE 4

Mechanical properties of composite samples

| Example | 3-point bending strength (MPa) | Delamination area after impact (cm²) | Compressive strength (MPa) | Tensile strength (MPa) | Tensile stiffness (GPa) | Failure strain (%) |
|---|---|---|---|---|---|---|
| 3 | 102 ± 14 | 1.5 ± 0.3 | 800 ± 50 | 516 ± 14 | 22.6 ± 1.8 | 2.7 ± 0.1 |
| 10 | 110 ± 16 | — | — | — | — | — |
| 11 | 107 ± 13 | — | — | — | — | — |
| A | 51 ± 6 | 2.5 ± 0.7 | 610 ± 135 | — | — | — |
| B | 19 ± 7 | — | — | — | — | — |
| C | 81 ± 7 | 3.5 ± 0.9 | 820 ± 150 | 502 ± 33 | 25.6 ± 3.1 | 2.9 ± 0.1 |

The obtained 3-point bending strengths show that a composite plate based on the composition of Example 3 shows the highest values, even higher than those obtained for the Epikote 828/3832 combination. Adhesion between the glass fibers and the matrix in these materials can be considered to be very good. The bending strength observed for the composite plate based on a composition of Comparative Experiment is very low, indicating a poor adhesion. This is due to the fact that the sizing composition on the glass fibers was not compatible with the PDCPD matrix.

The compression strength of the composites of Example 3 and of Comparative Experiment C does not differ significantly. The compression strength of the composites of Comparative Experiment A however is significantly lower. This confirms a significantly improved fibre-matrix adhesion of Example 1 composites, as compared to a Comparative Experiment A composite.

The results of drop weight impact tests with impact energies of 15 and 25 Joules show that the delamination damage in the epoxy laminates according to Comparative Experiment C is more severe for both impact energy levels. For the same impact energy, the measured delamination size is about 2 times larger for the epoxy laminate according to Comparative Experiment C than for the laminate in accordance with Example 3.

A central delaminated region is visible on the impact site. In the epoxy samples according to Comparative Experiment C this region is surrounded by matrix cracks. These are not visible in a laminate according to Example 3. Example 3 laminates do not show a lot of damage up to around 1% of strain, after which a limited amount of short localized transverse and longitudinal cracks are found to develop. Final failure is very localized and occurs by transverse fiber failure, accompanied by very limited delamination.

In the epoxy laminates of Comparative Experiment C however, after 0.5% of strain, a multitude of transverse matrix cracks can already be seen. The numbers of cracks increases rapidly and longitudinal cracks are found to develop between 1 and 2% strain. The first delamination occurs between 2 and 2.5% strain and are localized on the 'cross-over' points of the fibre bundles (as is normal in a woven laminate). Many delamination's are then formed, which coalesce and finally cause final failure by extensive delamination and fibre failure.

The noted difference in behavior is remarkable and confirms the high toughness of composite laminates according to the invention, and a good resistance against delamination.

Figure 3:
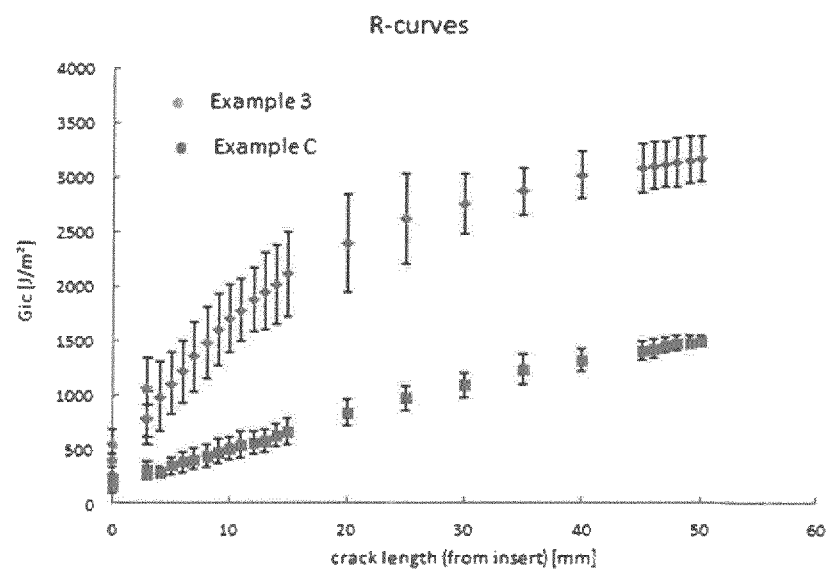
FIG. 3: Mode I interlaminar fracture toughness (G1c) values for different crack lengths.

Double cantilever beam tests were done to determine the mode I interlaminar fracture toughness GI. The results (FIG. 3) indicate that all initiation and propagation values of the interlaminar fracture toughness for laminate according to Example 3 are consistently much higher than that of the laminates of Comparative Experiment C, indicating a much higher resistance to delamination. This is consistent with the observations made in the impact damage tests.

The invention claimed is:

1. A method of manufacturing a molded article of a curable composition, the method comprising:
   combining at least the following components:
   (A) a cyclic olefin;
   (B) a metathesis catalyst for polymerizing the cyclic olefin;
   (C) 0.1-30 wt. % of a compound comprising at least one vinyl group; and
   (D) 0.1-10 wt. % of a curing agent for compound (C),
   wherein the wt. % are relative to the total weight of the composition to form the composition; and
   subjecting the composition to conditions effective to promote an olefin metathesis reaction of the cyclic olefin and a radical polymerization of compound (C).

2. The method according to claim 1, wherein compound (C) has a Hildebrandt solubility parameter $\delta_T$ comprised between 15.4 and 19.8 MPa$^{1/2}$.

3. The method according to claim 1, wherein the composition comprises 3-20 wt. % of compound (C).

4. The method according to claim 1, wherein compound (C) comprises a (meth)acrylate compound.

5. The method according to claim 1, wherein the composition comprises 0.2-1 wt. % of the curing agent.

6. The method according to claim 1, wherein the curing agent comprises a radical initiator.

7. The method according to claim 6, wherein the radical initiator comprises a non-cyclic peroxide.

8. The method according to claim 1, wherein the cyclic olefin comprises a dicyclopentadiene.

9. The method according to claim 1, wherein the composition comprises reinforcing fibers provided with a sizing composition.

10. The method according to claim 9, wherein a film former of the sizing composition has a Hildebrandt solubility parameter $\delta_T$ comprised between 15.9 and 19.9 MPa$^{1/2}$.

11. The method according to claim 9, wherein a film former of the sizing composition comprises a (co)polymer of monomer units having from four to six carbon atoms and one carbon-carbon double bond.

12. The method according to claim 11, wherein the film former comprises polybutadiene.

13. The method according to claim 9, wherein a film former of the sizing composition comprises paraffin wax.

14. The method according to claim 9, wherein a coupling agent of the sizing composition comprises a silane compound having unsaturations.

15. The method according to claim 1, comprising the additional step of:
   contacting the curable composition with an adhering substrate; and
   subjecting the curable composition to conditions to provide a bond between the composition and the adhering substrate.

16. The method according to claim 15, comprising the step of injecting the composition into a closed mold, wherein the mold is provided with reinforcing fibers prior to injecting the composition.

17. The method according to claim 1, wherein the conditions comprise heating at a temperature of between 120° C.-150° C. during at most 60 minutes.

18. A molded article of a composite material, comprising (a) a matrix polymer prepared by a method in accordance with claim 1.

19. The molded article according to claim 18, wherein the matrix polymer has a volatile content of less than 3 wt. % relative to the total weight of the matrix polymer.

20. The molded article according to claim 18, wherein the composite material properties at least satisfy one of:
   a glass transition temperature Tg according to ASTM D7028-07e1 above 180° C.;
   a transverse 3 point bending strength according to ISO 14125 above 50 MPa; and
   a $G_{1c}$ according to ISO 15024 above 800 J/m$^2$.

* * * * *